United States Patent
Vaderna et al.

(10) Patent No.: US 9,331,951 B2
(45) Date of Patent: May 3, 2016

(54) PATH DISCOVERY IN DATA TRANSPORT NETWORKS BASED ON STATISTICAL INFERENCE

(71) Applicant: TELEFONAKTIEBOLAGET L M ERICSSON (PUBL), Stockholm (SE)

(72) Inventors: Peter Vaderna, Budapest (HU); Péter Benkő, Budapest (HU); András Veres, Bupdapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 51 days.

(21) Appl. No.: 14/224,790

(22) Filed: Mar. 25, 2014

(65) Prior Publication Data

US 2015/0281105 A1    Oct. 1, 2015

(51) Int. Cl.
| | |
|---|---|
| H04L 12/801 | (2013.01) |
| H04L 12/26 | (2006.01) |
| H04L 12/729 | (2013.01) |
| H04L 12/24 | (2006.01) |
| H04L 12/721 | (2013.01) |
| H04L 12/751 | (2013.01) |

(52) U.S. Cl.
CPC ............. *H04L 47/29* (2013.01); *H04L 41/12* (2013.01); *H04L 43/08* (2013.01); *H04L 43/0882* (2013.01); *H04L 45/125* (2013.01); *H04L 45/38* (2013.01); *H04L 45/70* (2013.01); *H04L 47/18* (2013.01); *H04L 45/02* (2013.01); *H04L 45/14* (2013.01)

(58) Field of Classification Search
None
See application file for complete search history.

(56) References Cited

U.S. PATENT DOCUMENTS

| | | | |
|---|---|---|---|
| 6,145,089 A * | 11/2000 | Le et al. ...................... | 714/4.4 |
| 6,981,055 B1 | 12/2005 | Ahuja et al. | |
| 7,293,086 B1 | 11/2007 | Duffield | |
| 7,483,374 B2 * | 1/2009 | Nilakantan et al. ......... | 370/235 |

(Continued)

FOREIGN PATENT DOCUMENTS

| | | |
|---|---|---|
| CN | 102082690 A | 6/2011 |
| EP | 1 387 527 A1 | 2/2004 |
| WO | WO 2010/090561 A1 | 8/2010 |

OTHER PUBLICATIONS

IEEE. IEEE Standard for Local and Metropolitan Area Networks—Station and Media Access Control Connectivity Discovery. IEEE Std. 802.1AB. 2009.

(Continued)

*Primary Examiner* — Faruk Hamza
*Assistant Examiner* — Tito Pham

(57) ABSTRACT

A method and network management node for determining the managed nodes on a path from a given source node to a given destination node based on a statistical inference of traffic volume reports available from the nodes. Traffic counts from Performance Management (PM) counters are collected from all managed transport nodes including the source and destination nodes. Based on the observed pattern of traffic volume received from the PM counters, the most likely matching path from a given source to a given destination is selected. If the traffic counts are insufficient to establish a path with adequate certainty, the method may optionally generate additional traffic from the source node to the destination node to increase the reliability of the path determination.

22 Claims, 5 Drawing Sheets

(56) References Cited

U.S. PATENT DOCUMENTS 7,760,735 B1 7/2010 Chen et al.
8,054,756 B2 11/2011 Chand et al.

OTHER PUBLICATIONS

Donnet, et al. Internet Topology Discovery: A Survey. IEEE Communications Survey and Tutorials, 2007.

3GPP. $3^{rd}$ Generation Partnership Project; Technical Specification Group Services and System Aspects; Telecommunications Management; Performance Management (PM); Concept and Requirements (Release 11). 3GPP TS 32.401 v11.0.0. Sep. 2012.

3GPP. $3^{rd}$ Generation Partnership Project; Technical Specification Group Services and System Aspects; Telecommunications Management; Performance Management (PM); Performance Measurements; Universal Terrestrial Radio Access Network (UTRAN) (Release 11). 3GPP TS 32.405 v11.1.1. Dec. 2012.

3GPP. $3^{rd}$ Generation Partnership Project; Technical Specification Group Services and System Aspects; Telecommunication Management; Fixed Mobile Convergence (FMC) 3GPP/TM Forum Concrete Model Relationships and Use Cases (Release 11). 3GPP TR 32.854 v11.0.2. Mar. 2013.

3GPP. $3^{rd}$ Generation Partnership Project; Technical Specification Group Services and System Aspects; Telecommunication Management; Fixed Mobile Convergence (FMC) Federated Network Information Model (FNIM) Umbrella Information Model (UIM) (Release 11) 3GPP TS 28.620 v11.0.0. Mar. 2013.

Medina, A., et al., "Traffic Matrix Estimation: Existing Techniques and New Directions," ACM, New York, NY, USA; Aug. 19, 2002.

\* cited by examiner

PATH DISCOVERY IN DATA TRANSPORT NETWORKS BASED ON STATISTICAL INFERENCE

TECHNICAL FIELD

The present disclosure relates to communication systems. More particularly, the disclosure is directed to a method and network management node configured to determine a path followed by traffic through a communication network between a source node and a destination node.

BACKGROUND

Network management in telecommunication networks is a very important area for operators to be able to assure secure, reliable, and high-quality service. On the other hand, due to the diversity and heterogeneity of telecommunication networks, their management becomes more and more complex and complicated for operators. Usually, an Operating Support System (OSS) or a Network Management System (NMS) is needed to provide network management.

Topology discovery and path discovery in packet data transport networks (TNs) is an important task for network operators. The exact path of the traffic is not always known, partly because some transport nodes have limited management support and limited functionality for existing topology discovery protocols/methods and partly because the central configuration/inventory has no topology information or the existing topology information is outdated.

Even if the transport nodes are managed by the operator, it is not always possible to tell the exact path of the traffic. For the network operator to be able to identify bottlenecks, problems, or failures, a robust solution is needed that provides information on the actual path of the traffic through the transport network.

This problem is especially important in case of layered architectures such as 3G mobile systems, where independent technologies are combined into a common architecture as layers on top of layers. Different layers or domains (for example access network, core network, transport network, service network) are often from different vendors and are typically handled separately by different NMSs. Thus, the layers and the management systems are typically separated, making the connectivity problems especially difficult to trace.

Usually transport element management is provided by an NMS, but the explicit knowledge of the topology of the transport network is missing. Even though in most management systems there is a topology inventory, the path of the traffic flow is not always consistent with it. This can be due to many different reasons, for example traffic re-routing due to link/connection errors does not always appear in the topology inventory. Other reasons may include, for example, node reconfiguration, installing of new nodes, node upgrades, and the like.

It is possible to access the nodes via an Operation & Maintenance (O&M) system, but the links of the O&M system and the traffic are usually different. Getting IP routing information from the nodes via an O&M system is either not possible or not relevant because the next hop is not managed. Thus, topology and path information is cumbersome to obtain from the configuration files and the topology inventory files. Sometimes management systems exist for certain domains (for example, microwave, optical, or edge) separately, but there is no management system for the entire transport network as a whole.

FIG. 1 is a simplified block diagram of a typical transport network topology from the perspective of an NMS 11. The nodes are inter-connected via transport links 12, as shown by the solid lines. The nodes are managed by the NMS 11, and the NMS obtains configuration and performance data from the nodes via O&M links 13, shown as dashed lines. However, the NMS does not know how the nodes are connected to each other. For example, the NMS does not know whether the path from Node 122 to Node 1 is through Node 11 or Node 12. The NMS receives only information related to element-management functions that are available via the O&M links, but topology information is missing. Topology awareness would significantly help in network-wide network management functions such as fault location and the identification of bottleneck conditions.

There are a number of existing methods for topology/path discovery. The result of topology/path discovery is a list of nodes that the traffic goes through from the source to the destination. Once the path is known, the network management functions such as fault localization and bottleneck identification are easier and more efficient. Moreover, the transport topology can change over time due to network upgrades or automatic re-routing of the traffic. Thus, the topology/path information should be updated from time to time to provide the exact path of the traffic.

Given the heterogeneity and complexity of transport networks, each of the existing methods for topology/path discovery has advantages and disadvantages depending on the assumptions made and the feasibility and applicability of the method. Link layer (L2) and network layer (L3) topology discovery is usually distinguished in the method algorithms. In general terms, the following basic types of methods exist to discover path/topology (applicable to both L2 and L3 topology):

Maintaining a complete end-to-end configuration/connection management functionality in the O&M system;

Querying for routing/switching information directly from the nodes;

Active probing by echo requests such as ping or trace route utilities; and

Passive probing on the links (interface sniffing).

The drawback of the first and second type of method (i.e., having a complete awareness of end-to-end network configuration and connection or querying the nodes directly for routing/switching information) is that these methods assume accessibility to all nodes on the path and availability of the routing information. These methods fail when the required information is unavailable from the node, or when the information about the next hop is available but the next hop is unavailable. The drawback of the third type of method (i.e., active probing by echo requests) is that either the nodes do not support echo requests for security reasons or these types of packets are handled differently and are routed on a different path. The drawback of the fourth type of method (i.e., passive probing, interface sniffing) is that deployment of interface monitoring devices is feasible for only a limited number of links within the transport network.

The main contributions of the state of the art in topology/path discovery are as follows:

1. In order to harmonize the existing management systems, there are initiatives to converge the managed object models of different domains. Specifically, to align the management issues between Radio Access Networks and Transport Networks, a Joint Working Group (JWG) has been formed between the 3rd Generation Partnership Project (3GPP) and the TM Forum (formerly TeleManagement Forum). Details are available in 3GPP TR 32.854 V11.0.2 Telecommunication management; Fixed Mobile Convergence (FMC) 3GPP/TM Forum concrete model relationships and use cases.

The state of the art of the converged management model in the 3GPP and TM Forum is an Umbrella Information Model (UIM) on top of which concrete working models can be built from each domain. Details are provided in 3GPP TS 28.620 Telecommunication management; Fixed Mobile Convergence (FMC) Federated Network Information Model (FNIM) Umbrella Information Model (UIM). More specifically, UIM has an abstract class, TopologicalLink, but associations to other entities are missing. No technical solutions to the problem is presented in the standards and it is explicitly stated in the solution proposal in 3GPP TR 32.854 (section 4.6) that topology discovery is not considered there. In this respect, the present disclosure provides one solution to populate the object model.

2. For discovering Ethernet connectivity, there is a standard protocol called Link Layer Discovery Protocol (LLDP) described in IEEE 802.1ab, Station and Media Access Control Connectivity Discovery. LLDP allows the nodes to advertise management information. The information is stored in a standard Management Information Base (MIB) that can be accessed using the Simple Network Management Protocol (SNMP). However, LLDP is only applicable for L2. Moreover, LLDP is not implemented in all nodes.

3. Active traceroute-based methods for L3 topology discovery are described in the document, B. Donnet et al., Internet topology discovery: a survey (IEEE Communications Survey and Tutorials, 2007). However, the active traceroute-based methods have several limitations. First, they are applicable only for IP networks. Moreover, some routers ignore the echo requests thus making the method less reliable. An additional drawback is that it is only possible to obtain forward path information; reverse path information cannot be discovered by the methods presented by Donnet et al.

4. European Patent Application EP1 387 527 A1 and Chinese Patent Application CN102082690A describe path discovery methods where the algorithm is based on information obtained from interface monitoring. The discovery methods based on interface monitoring have the limitation that passive monitoring of all links is not feasible on a large-scale network. On the other hand, restricting the number of monitored links limits the number of nodes to discover.

5. U.S. Patent Application Publication US2006523371A discloses a path discovery method where user sessions are measured and identified in each node. However, the disclosed method is restricted to those networks where user sessions are maintained in the nodes. In a transport network, user sessions are typically not maintained and cannot be logged in the nodes.

6. U.S. Patent Application Publication US2007703461A discloses an iterative method for discovering the path from a given source or destination, where the system discovers the next hop based on information queried from the current hop. However, the disclosed algorithm assumes that management information is available from all nodes on the network path, but this is not always the case.

7. International Patent Application WO2010/090561A1 discloses a method of automatic notification about a new node to a topology-aware system. Thus, a topology aware entity is assumed, but this is not always the case even if there is an NMS.

SUMMARY

None of the above methods provides a general solution to the problem, i.e., given a starting access node, identify what intermediate nodes the subscriber traffic goes through while enroute to a destination node.

Different embodiments of the present disclosure provide methods and apparatuses for overcoming the disadvantages of the existing solutions.

In the following disclosure, it is assumed there is a list of transport nodes (routers/switches) managed by the operator with a system such as an NMS or an OSS, but neither routing information nor any configuration/inventory information contains the actual path of the traffic. The present disclosure provides a method to determine the managed nodes on the path from a given source to a given destination based on statistical inference of the traffic volume reports available from the nodes. In order to find the nodes that are along the path from the source to the destination, traffic counts from Performance Management (PM) counters are collected from all managed transport nodes including the source and destination nodes. Based on the observed pattern of traffic volume received from the PM counters, the most likely matching path from a given source to a given destination is selected. If the traffic counts are insufficient to establish a path with adequate certainty, the method may optionally generate traffic from the source node to the destination node to increase the reliability of the path determination.

According to one embodiment, the disclosure relates to a method in a network management node for determining a path followed by traffic through a communication network between a source node and a destination node. The communication network includes a plurality of intermediate nodes, and the traffic passes through at least one of the intermediate nodes between the source and destination nodes. The method includes collecting by a path analysis unit, traffic-volume information from the source node, the plurality of intermediate nodes, and the destination node; and determining by the path analysis unit, a best matching path utilizing a statistical inference from the collected traffic-volume information.

Furthermore, a network management node is disclosed. The network management node is configured to determine a path followed by traffic through a communication network between a source node and a destination node, wherein the communication network includes a plurality of intermediate nodes, and the traffic passes through at least one of the intermediate nodes between the source and destination nodes. The network management node includes a processor for controlling the network management node when executing computer program instructions stored in an associated non-transitory memory; a receiving interface configured to receive traffic-volume information from the source node, the plurality of intermediate nodes, and the destination node; and a path analysis unit configured to collect the traffic-volume information and determine a best matching path utilizing a statistical inference from the collected traffic-volume information.

The method of the present disclosure advantageously provides a list of nodes through which the traffic actually flows. The method is automatic and robust, and it may be implemented utilizing standardized PM counters. Further features and benefits of embodiments of the disclosure will become apparent from the detailed description below.

BRIEF DESCRIPTION OF THE DRAWINGS

In the following section, the invention will be described with reference to exemplary embodiments illustrated in the figures, in which.

DETAILED DESCRIPTION

Figure 1:
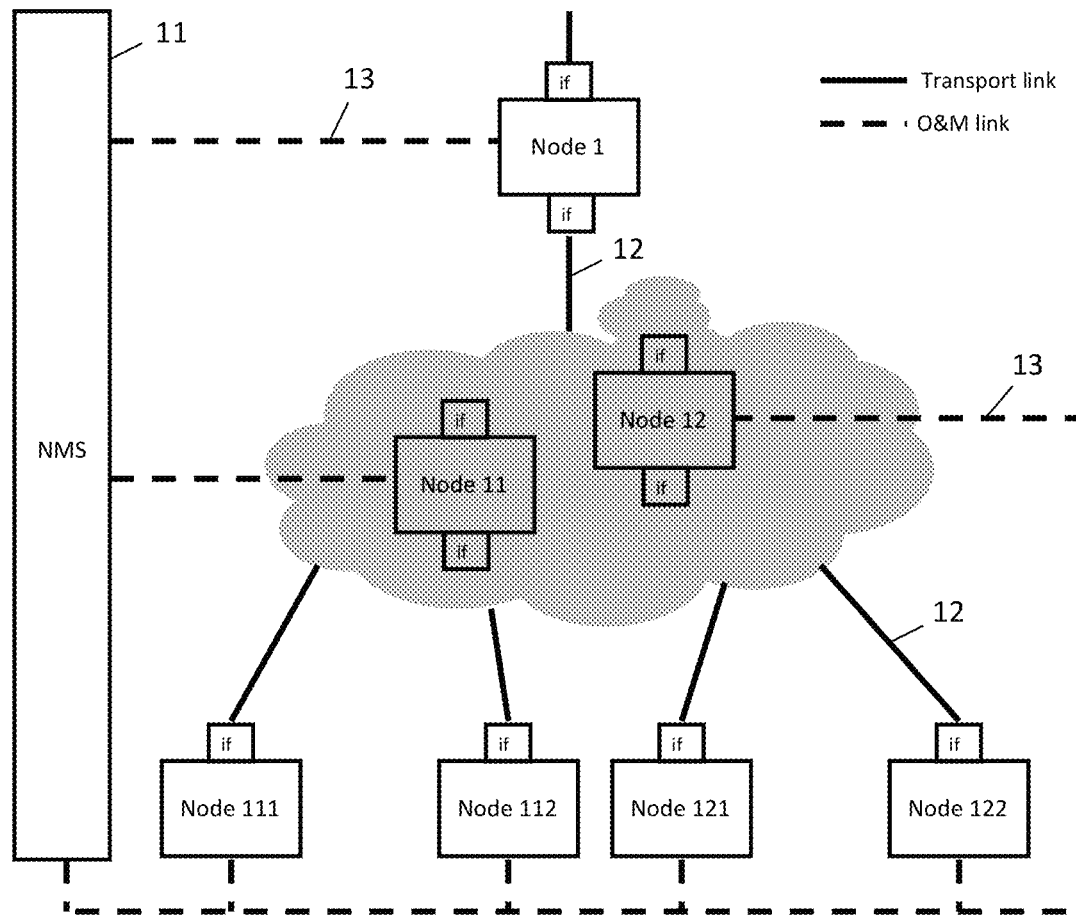
FIG. 1 is a simplified block diagram of a typical transport network topology from the Network Management System (NMS) perspective.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

Figure 2:
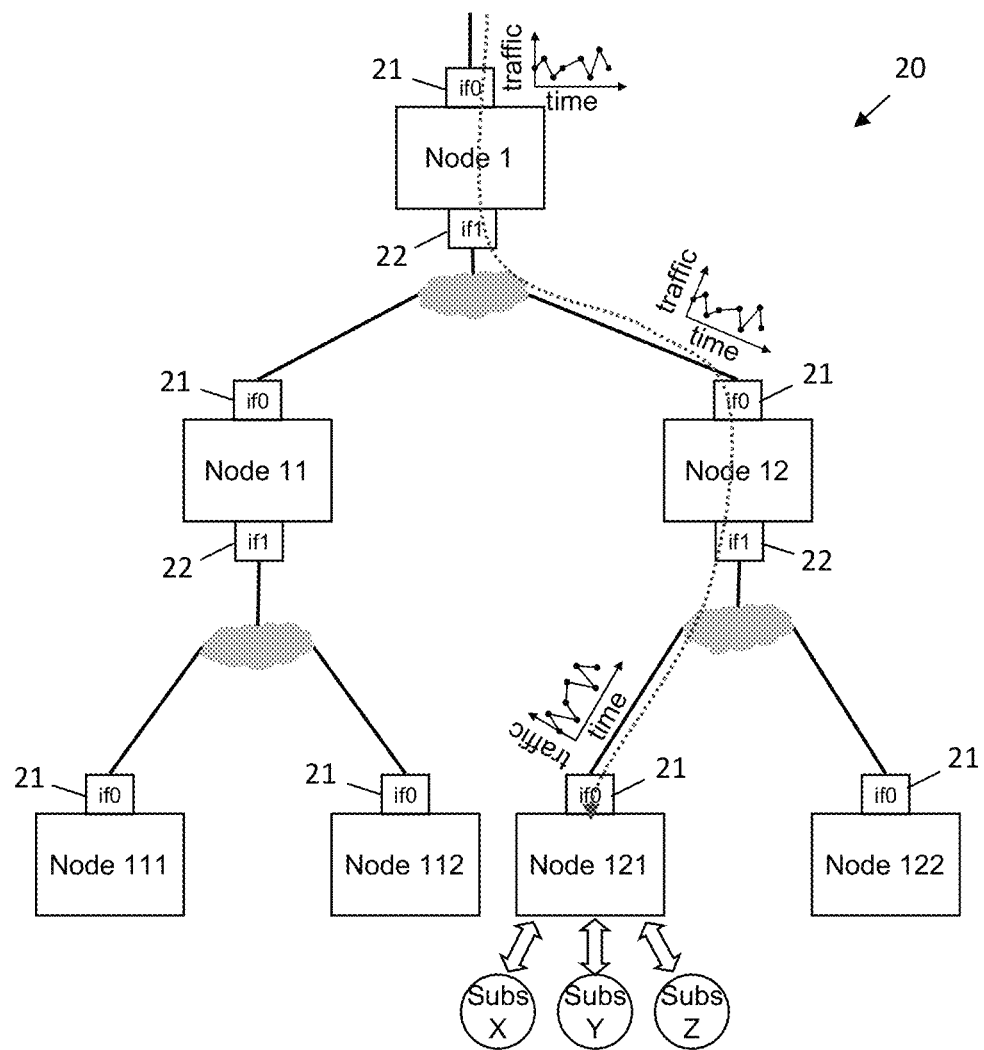
FIG. 2 is a simplified block diagram of a transport network (TN) of a mobile Radio Access Network (RAN) in which the disclosed method may be implemented to discover the topology/path of the TN.

FIG. 2 is a simplified block diagram of a transport network (TN) 20 of a mobile Radio Access Network (RAN) in which the disclosed method may be implemented to discover the topology/path of the TN. A given subscriber in the network is attached to an access node such as a Radio Base Station (RBS) that is usually the node located closest to the subscriber. Thus, traffic to and from the subscriber is routed through the access node. The attachment can be determined by different methods, such as observing signaling messages, node logs, or by physical inventory examination, and the like. In FIG. 2, Subscriber X is attached to Node 121. In some access networks, the traffic may flow through an intermediate node such as a Base Station Controller (BSC) enroute to a central switching node/gateway node such as a Radio Network Controller (RNC), which interfaces the RAN with a core network (not shown). In FIG. 2, the intermediate node is shown as Node 12, and the central switching node/gateway node is shown as Node 1. Uplink PM counters (if0) 21 and downlink PM counters (if1) 22 in each node count and report the traffic level over time. The traffic of Subscriber X contributes to the traffic measured in Node 121, Node 12, and Node 1.

Figure 3:
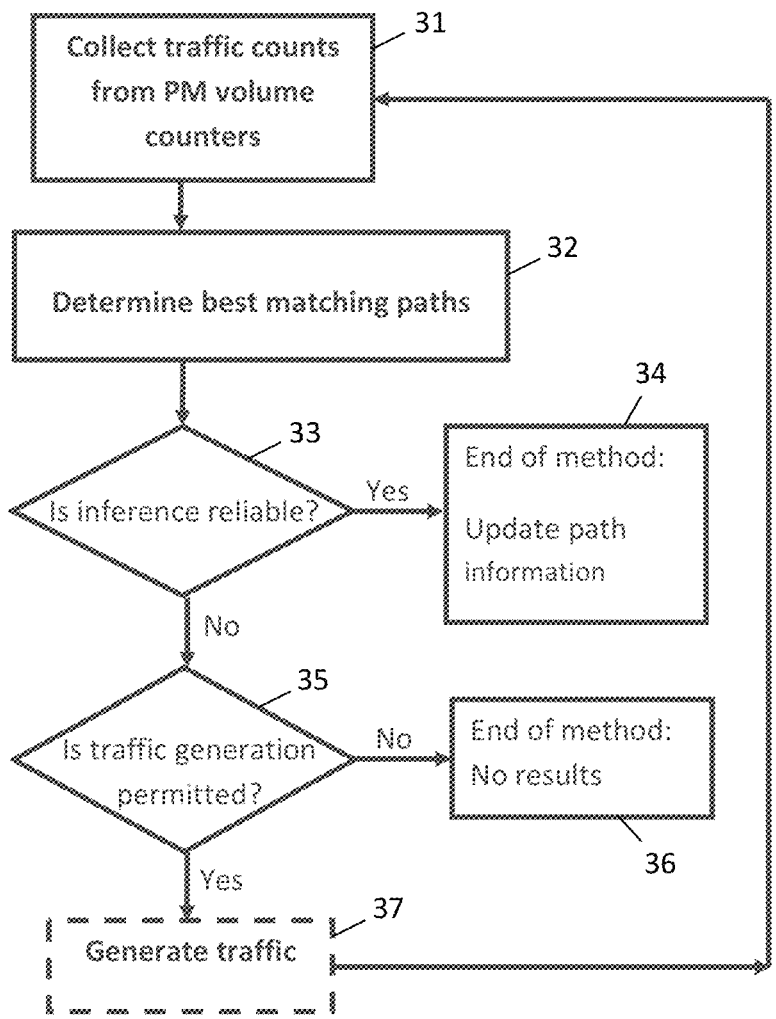
FIG. 3 is a flow chart schematically illustrating an exemplary embodiment of the method of the present disclosure.

FIG. 3 is a flow chart schematically illustrating an exemplary embodiment of the method of the present disclosure. The algorithm to obtain the list of nodes on the path consists of three main steps, although the third step is conditional and is only performed when the results of the second so indicate. The first step is shown at 31, where traffic-volume information is collected, for example from PM counters 21 and/or 22. The second step, with two sub-steps, is shown at 32-36. At 32, the best matching path is selected using statistical inference from the collected traffic-volume information. At sub-step 33, it is determined whether the statistical inference is reliable. If the inference is reliable, the path information is updated and the method ends at 34. If the inference is not reliable, it is determined at sub-step 35 whether traffic generation (to improve the reliability of the inference) is permitted. If not, no results are obtained and the method ends at 36. However, if traffic generation is permitted, the method performs the third step where traffic is generated at 37. After this the loop returns to 31 and repeats the method. The three main steps of the method are further explained in the following sections.

Step 1: Data Collection.

In order to determine the path of the subscriber's traffic, the traffic volume of the access node in the given direction (uplink or downlink) and the traffic volume of all other nodes in the access network (including transport nodes and central switching nodes/gateway nodes) in the given direction are collected. An NMS may be used to poll the traffic volume of different nodes in the access network. The traffic volume information may be, for example, either the number of bytes or the number of packets received within certain reporting periods (ROP). The ROP length may be in a range of minutes (for example, 10-15 minutes), but may also be in a range of seconds or hours. Different interfaces should be monitored on each node depending on the path direction being explored.

The traffic volume per ROP may be accessed via standardized PM counters in the nodes. Additional details of the standardized PM counters are provided in 3GPP TS 32.401 Performance Management (PM); Concept and requirements, and in 3GPP TS 32.405 Performance Management (PM); Performance measurements (UTRAN), both of which are incorporated herein by reference. The collection of the traffic counters may be run continuously in the NMS. It is assumed that the time is synchronized in the nodes so that the counters from different nodes in the same ROPs can be correlated. For the algorithm to work, it is not necessary to have very precise synchronization. For example, for a 15-minute ROP, a time accuracy of approximately one minute should be sufficient.

As an example, reference may be made to FIG. 1, where traffic-volume information may be collected describing the uplink traffic volume received in a corresponding ROP at different nodes on interface if0. The traffic volume information may indicate, for example:

Node 121, interface if0: $v_1, v_2, v_3, \ldots v_n$
Node 12, interface if0: $w_1, w_2, w_3, \ldots w_n$
Node 11, interface if0: $u_1, u_2, u_3, \ldots u_n$
Node 1, interface if0: $z_1, z_2, z_3, \ldots z_n$ The downlink traffic may likewise be described by the traffic volume counters on the if1 interfaces.

Step 2: Determining Best Matching Paths

The second step is to determine the best matching path, i.e., the list of transport nodes on the path between the source node (Node 121) and destination node (Node 1). The most likely matching path is selected based on observing the patterns of traffic-volume counters. The selection is based on statistical inference performed by a statistical method, examples of which are provided below. The input to the statistical method is the time series of the traffic volume information obtained in Step 1. The outcome of Step 2 is a list of nodes (L) representing the best matching path and a reliability measure (R) representing whether or not the statistical inference is significant. L and R are calculated according to the statistical method being utilized. If R is true, the statistical inference is considered as reliable (for example, a sufficient number of patterns have been observed to reduce the probability of false detection to a negligible level). However, if R is false, the statistical inference is not reliable (for example, the number of observed patterns is insufficient).

There are several ways to calculate L and R. One embodiment uses correlation coefficients for this task as described below.

In order to find the nodes that are along the path of a given subscriber's traffic, the Pearson product-moment correlation coefficient is calculated pairwise between the traffic volume of the subscriber attachment node (i.e., source node) and the traffic volume of all the other nodes in the access network. The correlation calculation gives a coefficient r between [−1, 1] and a p value between [0, 1], where the correlation coefficient r describes the strength of the correlation, and p describes the reliability of the correlation calculation.

The correlation coefficients between the source node 121 and all other nodes (excluding the other access nodes, e.g., Node 111, Node 112, and Node 122) are sorted and the nodes having a correlation coefficient with the source node 121 above a coefficient strength threshold (thresh1) are considered as part of the path between the source node 121 and the destination node 1. In one embodiment, the coefficient strength threshold (thresh1) is set equal to the correlation coefficient between the traffic volume of the source node and the destination node. If the p-value is small (e.g. p<0.05) then the correlation is significant. Thus, only those nodes having a correlation coefficient with a p-value less than a coefficient reliability threshold (thresh2) are considered as candidate nodes for the path. In one embodiment, the coefficient reliability threshold (thresh2) for the p-value is set equal to 0.05. That is, if p<0.05 then the correlation coefficient is considered significant. The result of Step 2 is a list (L) of nodes whose traffic volume is correlated with the traffic volume of the source node and a reliability measure (R) indicating the reliability of the inference.

In one embodiment, R is determined by measuring the correlation between the source node 121 and the destination node 1. If the correlation is significant (p<0.05) then R is set to true, the list of nodes on the path is considered to be known, and L can be reported or the inventory can be updated. If the correlation is not reliable (p>0.05) then R is set to false.

Step 3: Traffic Generation

If the best matching path cannot be determined with sufficient accuracy in Step 2 (i.e., R is false), either because of a shortage of time or the traffic statistics are not distinguishable with sufficient certainty, the method may trigger traffic generation to improve the reliability of the inference. Thus, when the correlation coefficient between the source node 121 and the destination node 1 has a p-value greater than the coefficient reliability threshold (thresh2) value, additional traffic may be generated in the network to increase the reliability measure.

During traffic generation, the objective is to boost the matching algorithm's capability. This can be achieved several ways. Two such ways are, for example:

1. When a ratio of the traffic volume in the source node compared to the destination node is below a traffic-volume threshold (thresh3) value, insert a detectable amount of traffic over the determined path to increase the ratio to a level above the a traffic-volume threshold (thresh3) value, thereby decreasing the p-value of the correlation coefficient to a greater reliability level.

2. Create traffic with a special detectable intensity pattern, which is easy to capture by the detection algorithm. For example, create short bursts at predetermined time periods. This method can reduce the amount of extra traffic necessary.

EXAMPLE

The following example presents a solution for path discovery in a 3GPP RAN transport network. The communication protocols between the radio sites (RBS, eNodeB, and the like) and the switching sites (for example RNC) or packet gateways (for example Serving or Packet Data Network (PDN) Gateway, S/P-GW) are standardized in 3GPP. However, the transport network carrying user-plane traffic can vary a lot based on the multiple technologies and layers used (microwave, optical, Multi-Protocol Label Switching (MPLS), Internet Protocol (IP), Ethernet, Synchronous Digital Hierarchy (SDH), Plesiochronous Digital Hierarchy (PDH), and the like). In most cases a mixture of different technologies and layers exists in the transport network. In most cases transport network elements are from different vendors. Moreover, operators often use leased lines in certain domains of their transport solutions.

Due to the high variability, maintaining and managing transport networks is a challenging task, although it is very important for mobile operators to keep the operational costs low.

Figure 4:
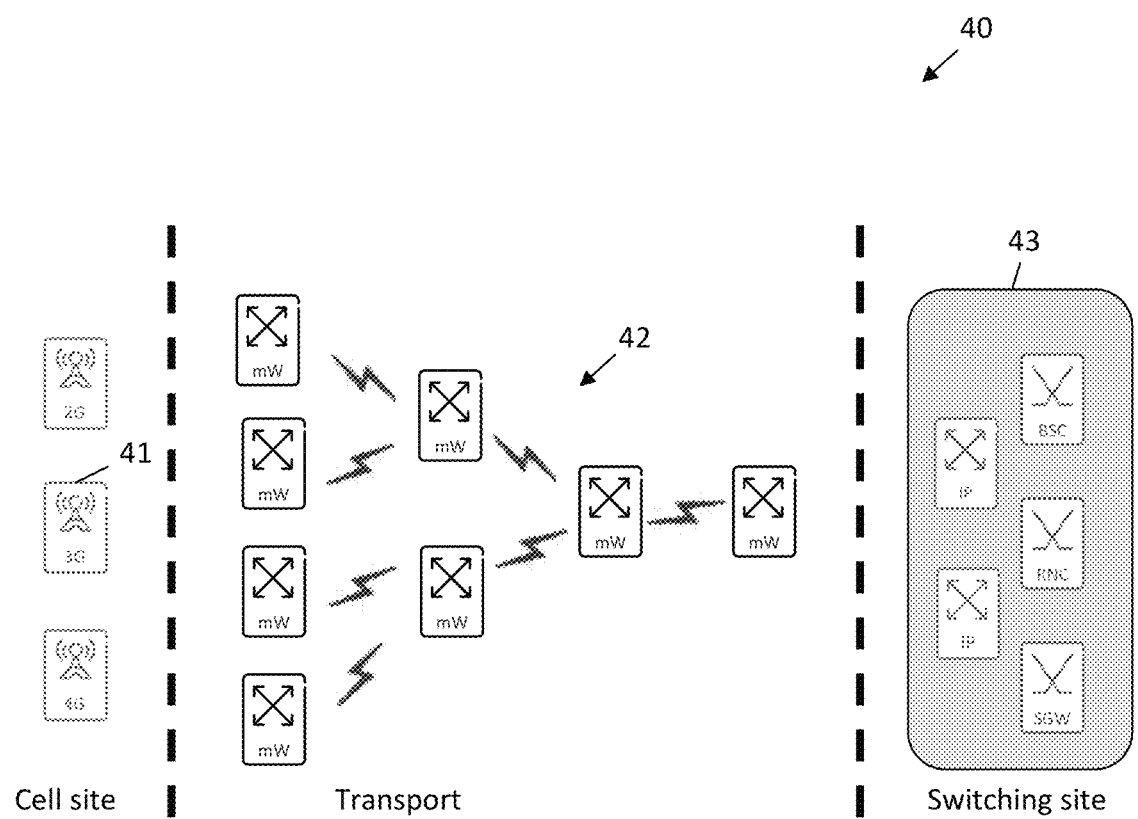
FIG. 4 is a simplified block diagram of a high-level architecture of a mobile network where multiple technologies (2G-3G-4G) co-exist and the transport solution is built mainly on microwave links.

FIG. 4 is a simplified block diagram of a high-level architecture 40 of a mobile network where multiple technologies (2G-3G-4G) co-exist and the transport solution is built mainly on microwave links. The transport nodes are connected in a tree-like structure.

It is possible to obtain traffic counts via the standardized counters in the O&M system from the nodes. These counts may be used to determine the current path of the traffic over the managed nodes in the following exemplary way:

Step 1: collect traffic counts from a specific source such as a 3G access node (RBS) 41 from the cell site; collect traffic counts from the microwave (mW) nodes 42 in the transport network; and collect traffic counts from the nodes at the switching site 43 (for example IP edge router or RNC).

Step 2: calculate correlation coefficient between the time series consisting of traffic counter measurements from the 3G access node and all other nodes from the transport network and the switching site. It is usually known which node in the cell site is connected to which node in the switching site, so in some cases it may be sufficient to calculate the correlation coefficient between the source RBS and the RNC to which it is connected. The mW nodes having a larger correlation coefficient with the RBS than thresh1 are considered to be part of the path. The parameter thresh1 may be set, for example, as the correlation coefficient between the traffic volume of the RBS and the RNC. Thus, those nodes are considered to be part of the path that correlates with the RBS better than the RNC. If the correlation is significant and the data is reliable, the list of the nodes on the path is considered to be known.

Step 3: if the correlation between the traffic volumes measured in the RBS and in the RNC is not significant and thus the data is not reliable (for example, when the traffic in the 3G access node is very low) then traffic is generated in a way that none of the network links become overloaded or congested. After traffic generation, the loop returns to Step 1.

Due to the randomness in the measured traffic volume, the order of the nodes on the path cannot be obtained with 100% reliability. However, some information regarding the order of the nodes on the path can be obtained using one or more of the following methods:

Sorting the correlation coefficients between the source node and the transport nodes on the path. The higher the correlation, the closer the transport node to the source node.

Collecting the correlation coefficients between all transport node traffic volume and all source node traffic volume, then counting for each transport node the number of sources where the correlation coefficient is higher than thresh1 and the correlation is significant. The parameters thresh1 and thresh2 may be derived in the same manner as Step 2.

Analyzing existing inventory data. Although inventory databases are not always complete and not always up-todate, the information can be used for determining the order of the nodes on the path.

Since statistical inference is based on the calculation of correlation coefficients between traffic volume counters in different nodes, one embodiment of the present disclosure filters out or eliminates effects that distort the traffic statistics. One typical example of this kind of effect is the daily variation of traffic. Due to the alternation of daytime and nighttime traffic, all nodes in the network have a specific daily traffic profile. Since the daily variation of the traffic is very similar in all nodes, the correlation coefficient increases in all cases. This effect induces higher correlation coefficients between the traffic of nodes that are not on the same path. To eliminate this effect, transformation of the traffic-volume data is needed.

The time series of the traffic counter may be denoted by D(t), where t denotes time dependence. In one embodiment, D(t) is transformed based on the following steps:

1. Generate Fourier components D(f) of the time series D(t) via Fourier transformation where f denotes frequency dependence;
2. Eliminate the component corresponding to the daily profile from the transformed set D(f) to get D'(f); and
3. Perform an inverse Fourier transformation on D'(f) to get the transformed set D'(t).

In another embodiment, the traffic-volume data is transformed utilizing a discrete wavelet transform and calculating the correlation coefficient in the wavelet domain. The wavelet transform is a generalization of the Fourier transform in the sense that not only the frequency domain but both the time and frequency domains are represented in the transformed function. Thus, calculating the correlation coefficient can be done on the transformed set. This method allows for a more accurate statistical inference since the short-range time variations are captured as well as long-range periodic variations. Moreover, the long-range periodic variations can be eliminated in a manner similar to the Fourier transform.

The method based on calculating the correlation coefficients between transformed data sets is thus made more reliable because the transformation eliminates the artificial components.

Figure 5:
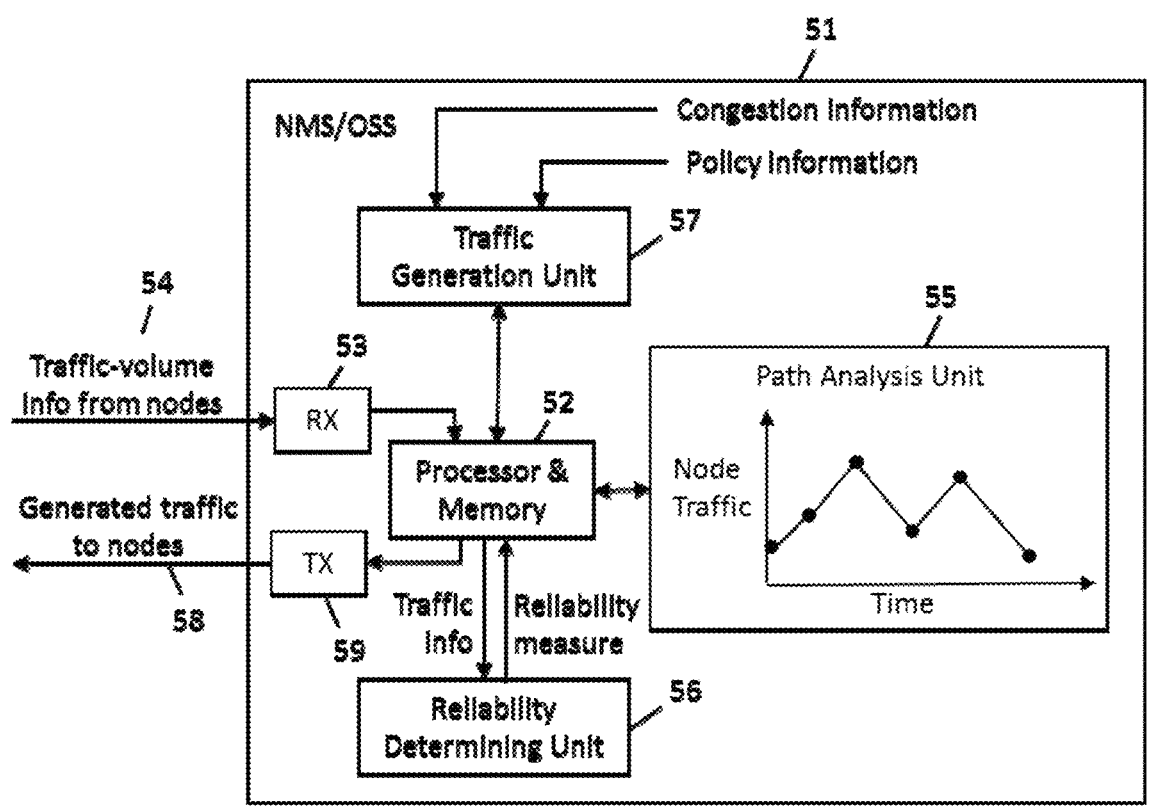
FIG. 5 is a simplified functional block diagram of a network management node in an exemplary embodiment of the present disclosure.

FIG. 5 is a simplified functional block diagram of a network management node 51 in an exemplary embodiment of the present disclosure. The network management node may be, for example, an NMS or an OSS node, which communicates with the network nodes via O&M links as shown in FIG. 1. The network management node may be controlled by a processor 52 when executing computer program instructions stored in an associated non-transitory memory.

A receiving interface (RX) 53 receives traffic-volume information 54 from network nodes including the source node 121, the plurality of intermediate nodes 12, and the destination node 1. The processor 52 passes the traffic-volume information to a path analysis unit 55, which collects the traffic-volume information and determines a best matching path utilizing a statistical inference from the collected traffic-volume information. The best matching path is selected based on observing the patterns of traffic-volume counters and on a statistical inference performed by a statistical method. The output of the path analysis unit is the list (L) of nodes in the best matching path.

In one embodiment, the path analysis unit 55 calculates a correlation coefficient pairwise between the traffic volume of the source node where the subscriber is attached and the traffic volume of the destination node and each of the intermediate nodes in the network. An intermediate node is identified as part of the path when the correlation coefficient is above the coefficient strength threshold (thresh1) value.

For clarity, FIG. 5 shows a reliability determining unit 56 separate from the path analysis unit although the outputs of these two units may be an intrinsic part of the statistical inference process. The statistical inference also calculates the reliability measure (R) representing whether or not the statistical inference is significant.

When a Pearson product-moment correlation coefficient is calculated, the process provides a correlation coefficient r between [−1, 1] and a p value between [0, 1] for each source node/intermediate node pair, where the correlation coefficient r describes the strength of the correlation, and p describes the reliability of the correlation calculation. The path analysis unit identifies as candidate nodes, only those intermediate nodes having a correlation coefficient with a p-value less than the coefficient reliability threshold (thresh2) value. When a given intermediate node has a correlation coefficient with an r-value greater than the coefficient strength threshold (thresh1) value, and a p-value less than the coefficient reliability threshold (thresh2) value, the path analysis unit adds the given intermediate node to the path information.

However, when the correlation coefficient between the source node 121 and the destination node 1 has a p-value greater than the coefficient reliability threshold (thresh2) value, the network management node 51 may determine whether it is permitted to generate additional traffic in the network to increase the reliability measure. FIG. 5 shows a traffic generation unit 57 that may make this determination based, for example, on congestion information for the network and/or on network policy information. When the generation of additional traffic is permitted, the traffic generation unit generates additional traffic 58, which is injected into the network by a transmitting interface 59. This process may continue until the correlation coefficient between the source node 121 and the destination node 1 has a p-value less than the coefficient reliability threshold (thresh2) value.

When a ratio of the traffic volume in the source node 121 compared to the destination node 1 is below a traffic-volume threshold (thresh3) value, the traffic generation unit 57 may insert a detectable amount of traffic over the determined path to increase the ratio to a level above the traffic-volume threshold (thresh3) value, thereby decreasing the p-value of the correlation coefficient to a greater reliability level. Alternatively, the traffic generation unit may insert over the determined path, traffic having a detectable intensity pattern, which the path analysis unit 55 can recognize.

The network management node 51 is also configured to determine the order of the nodes in the determined path and to eliminate effects such as daily traffic patterns that distort the traffic statistics, as described above.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a network management node for determining a path followed by traffic through a communication network between a source node and a destination node, wherein the communication network includes a plurality of intermediate nodes, and the traffic passes through at least one of the intermediate nodes between the source and destination nodes, the method comprising:

collecting by a path analysis unit, traffic-volume information from the source node, the plurality of intermediate nodes, and the destination node;

determining by the path analysis unit, a best matching path utilizing a statistical inference from the collected traffic-volume information;

determining whether sufficient traffic-volume information was collected for the statistical inference to be reliable; and updating path information with the best matching path when sufficient traffic-volume information was collected for the statistical inference to be reliable;

when sufficient traffic-volume information was not collected for the statistical inference to be reliable:

determining whether it is permitted to generate additional traffic in the network;

when it is not permitted to generate additional traffic in the network, stopping the method with no results; and when it is permitted to generate additional traffic in the network, generating additional traffic in the network until sufficient traffic-volume information is collected for the statistical inference to be reliable.

2. The method according to claim 1, wherein collecting traffic-volume information includes collecting from counters associated with each node in the network, uplink traffic counts, downlink traffic counts, or both uplink and downlink traffic counts during a reporting period.

3. A method in a network management node for determining a path followed by traffic through a communication network between a source node and a destination node, wherein the communication network includes a plurality of intermediate nodes, and the traffic passes through at least one of the intermediate nodes between the source and destination nodes, the method comprising:

collecting by a path analysis unit, traffic-volume information from the source node, the plurality of intermediate nodes, and the destination node; and determining by the path analysis unit, a best matching path utilizing a statistical inference from the collected traffic-volume information;

wherein determining a best matching path includes identifying the nodes that are along the path of a given subscriber's traffic, the identifying step comprising:

calculating a correlation coefficient pairwise between the traffic volume of the source node where the subscriber is attached and the traffic volume of the destination node and each of the intermediate nodes in the network; and identifying an intermediate node as part of the path when the correlation coefficient is above a coefficient strength threshold (thresh1) value.

4. The method according to claim 3, wherein the coefficient strength threshold (thresh1) value is equal to the correlation coefficient between the traffic volume of the source node and the destination node.

5. The method according to claim 3, wherein calculating a correlation coefficient includes calculating a Pearson product-moment correlation coefficient.

6. The method according to claim 5, wherein calculating a Pearson product-moment correlation coefficient provides a correlation coefficient r between [−1, 1] and a p-value between [0, 1] for each source node/intermediate node pair, where the correlation coefficient r describes the strength of the correlation, and p describes the reliability of the correlation calculation, where lower p-values are more significant, and the identifying step includes considering as candidate nodes, only those intermediate nodes having a correlation coefficient with a p-value less than a coefficient reliability threshold (thresh2) value.

7. The method according to claim 6, wherein the coefficient reliability threshold (thresh2) value for the p-value is 0.05.

8. The method according to claim 6, wherein when a given intermediate node has a correlation coefficient with an r-value greater than the coefficient strength threshold (thresh1) value, and a p-value less than the coefficient reliability threshold (thresh2) value, the method further comprises adding the given intermediate node to the path information.

9. The method according to claim 6, wherein when the correlation coefficient between the source node and the destination node has a p-value greater than the coefficient reliability threshold (thresh2) value, the method further comprises:

determining whether it is permitted to generate additional traffic in the network; and when it is permitted to generate additional traffic in the network, generating additional traffic in the network until the correlation coefficient between the source node and the destination node has a p-value less than the coefficient reliability threshold (thresh2) value.

10. The method according to claim 9, wherein when a ratio of the traffic volume in the source node compared to the destination node is below a traffic-volume threshold (thresh3) value, the step of generating additional traffic comprises inserting a detectable amount of traffic over the determined path to increase the ratio to a level above the traffic-volume threshold (thresh3) value, thereby decreasing the p-value of the correlation coefficient to a greater reliability level.

11. The method according to claim 9, wherein the step of generating additional traffic comprises inserting over the determined path, traffic having a detectable intensity pattern, which the path analysis unit can recognize.

12. The method according to claim 9, further comprising determining an order of the nodes on the best matching path by performing one or more of the following:

ranking the correlation coefficients between the source node and the intermediate nodes on the path from highest to lowest, wherein the higher the correlation, the closer the intermediate node is to the source node;

collecting the correlation coefficients between all intermediate node traffic volume and all source node traffic volume, then counting for each intermediate node, the number of sources where the correlation coefficient r-value is higher than the coefficient strength threshold (thresh1) value, and the correlation coefficient p-value is less than the coefficient reliability threshold (thresh2) value; and analyzing network inventory data.

13. The method according to claim 6, further comprising eliminating from the traffic-volume information, a component corresponding to a daily traffic profile, the eliminating step comprising:

performing a Fourier transformation of a time series of a traffic counter, D(t), to generate a set of Fourier components, D(f), where t denotes time dependence and f denotes frequency dependence;

eliminate the component corresponding to the daily traffic profile from the transformed set D(f) to get D'(f); and perform an inverse Fourier transformation on D'(f) to obtain a transformed set D'(t).

14. The method according to claim 6, further comprising eliminating from the traffic-volume information, a component corresponding to a daily traffic profile, the eliminating step comprising:

performing a discrete wavelet transformation to generate a set of transformed components in the wavelet domain, wherein both the time and frequency domains are represented in the transformed function; and calculating the correlation coefficient on the set of transformed components in the wavelet domain.

15. A network management node configured to determine a path followed by traffic through a communication network between a source node and a destination node, wherein the communication network includes a plurality of intermediate nodes, and the traffic passes through at least one of the intermediate nodes between the source and destination nodes, the network management node comprising:

a processor for controlling the network management node when executing computer program instructions stored in an associated non-transitory memory;

a receiving interface controlled by the processor and configured to receive traffic-volume information from the source node, the plurality of intermediate nodes, and the destination node;

a path analysis circuit controlled by the processor and configured to collect the traffic-volume information and determine a best matching path utilizing a statistical inference from the collected traffic-volume information;

a reliability determining circuit controlled by the processor and configured to determine whether sufficient traffic-volume information was collected for the statistical inference to be reliable; and a traffic generation circuit controlled by the processor;

wherein when sufficient traffic-volume information was collected for the statistical inference to be reliable, the path analysis circuit is configured to update path information with the best matching path; and wherein when sufficient traffic-volume information was not collected for the statistical inference to be reliable, the traffic generation circuit is configured to:
  determine whether it is permitted to generate additional traffic in the network;
  when it is not permitted to generate additional traffic in the network, stop the method with no results; and
  when it is permitted to generate additional traffic in the network, generate additional traffic in the network until sufficient traffic-volume information is collected for the statistical inference to be reliable.

16. The network management node according to claim 15, wherein the receiving interface is configured to receive from counters associated with each node in the network, uplink traffic counts, downlink traffic counts, or both uplink and downlink traffic counts during a reporting period.

17. The network management node according to claim 15, wherein the path analysis circuit is configured to identify the nodes that are along the path of a given subscriber's traffic by performing the following:

calculating a correlation coefficient pairwise between the traffic volume of the source node where the subscriber is attached and the traffic volume of the destination node and each of the intermediate nodes in the network; and identifying an intermediate node as part of the path when the correlation coefficient is above a coefficient strength threshold (thresh1) value.

18. The network management node according to claim 17, wherein the coefficient strength threshold (thresh1) value is equal to the correlation coefficient between the traffic volume of the source node and the destination node.

19. The network management node according to claim 17, wherein calculating a correlation coefficient includes calculating a Pearson product-moment correlation coefficient.

20. The network management node according to claim 19, wherein calculating a Pearson product-moment correlation coefficient provides a correlation coefficient r between [−1, 1] and a p-value between [0, 1] for each source node/intermediate node pair, where the correlation coefficient r describes the strength of the correlation, and p describes the reliability of the correlation calculation, where lower p-values are more significant, and the identifying step includes considering as candidate nodes, only those intermediate nodes having a correlation coefficient with a p-value less than a coefficient reliability threshold (thresh2) value.

21. The network management node according to claim 20, wherein when a given intermediate node has a correlation coefficient with an r-value greater than the coefficient strength threshold (thresh1) value, and a p-value less than the coefficient reliability threshold (thresh2) value, the path analysis circuit is further configured to add the given intermediate node to the path information.

22. The network management node according to claim 20, wherein when the correlation coefficient between the source node and the destination node has a p-value greater than the coefficient reliability threshold (thresh2) value, the traffic generation circuit is further configured to:
  determine whether it is permitted to generate additional traffic in the network; and
  when it is permitted to generate additional traffic in the network, generate additional traffic in the network until the correlation coefficient between the source node and the destination node has a p-value less than the coefficient reliability threshold (thresh2) value.

* * * * *